US009654452B2

(12) United States Patent
Li et al.

(10) Patent No.: US 9,654,452 B2
(45) Date of Patent: May 16, 2017

(54) PROTECTING SENSITIVE INFORMATION USING A TRUSTED DEVICE

(71) Applicant: International Business Machines Corporation, Armonk, NY (US)

(72) Inventors: Qining Li, Beijing (CN); Xi Qing Wang, Beijing (CN); Yan Yan, Beijing (CN); Zhen Xiang Yang, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 14/537,272

(22) Filed: Nov. 10, 2014

(65) Prior Publication Data

US 2016/0352704 A1    Dec. 1, 2016

(30) Foreign Application Priority Data

Nov. 11, 2013 (CN) .......................... 2013 1 0556745

(51) Int. Cl.
*H04L 9/00* (2006.01)
*H04L 29/06* (2006.01)
(Continued)

(52) U.S. Cl.
CPC ............ *H04L 63/0435* (2013.01); *H04L 9/14* (2013.01); *H04L 9/30* (2013.01); *H04L 63/0442* (2013.01);
(Continued)

(58) Field of Classification Search
CPC ............ H04L 63/0435; H04L 63/0442; H04L 63/061; H04L 63/083; H04L 63/168; H04L 9/14; H04L 9/30
(Continued)

(56) References Cited

U.S. PATENT DOCUMENTS 7,379,921 B1 * 5/2008 Kiliccote ............. G06Q 20/401
705/75
7,461,249 B1 * 12/2008 Pearson ................. G06F 21/10
705/59

(Continued)

OTHER PUBLICATIONS

U.S. Appl. No. 14/537,223 entitled "Protecting Sensitive Information Using an Untrusted Device", filed Nov. 10, 2014.

(Continued)

*Primary Examiner* — Joseph P Hirl
*Assistant Examiner* — Sayed Beheshti Shirazi
(74) *Attorney, Agent, or Firm* — William H. Hartwell

(57) ABSTRACT

The invention relates to information processing field, and discloses a method for protecting sensitive information, comprising: receiving first information transmitted by an untrusted device, where the first information enables the sensitive information to be transmitted from a trusted device to a server; receiving the sensitive information input by a user; generating second information based on the first information and the sensitive information; encrypting at least the sensitive information in the second information with a first secret key, wherein the first secret key meets one of the following: the untrusted device does not know the first secret key; and the untrusted device knows the first secret key but is unable use the first secret key to decrypt the encrypted sensitive information; and transmitting the second information containing the encrypted sensitive information to the untrusted device for forwarding to the server indicated by the first information.

9 Claims, 4 Drawing Sheets

(51) Int. Cl.
*H04L 9/14* (2006.01)
*H04L 9/30* (2006.01)

(52) U.S. Cl.
CPC .......... *H04L 63/061* (2013.01); *H04L 63/168* (2013.01); *H04L 63/083* (2013.01)

(58) Field of Classification Search
USPC ...................................... 713/171; 726/3, 4, 6
See application file for complete search history.

(56) References Cited

U.S. PATENT DOCUMENTS

| | | | | |
|---|---|---|---|---|
| 2005/0120201 A1* | 6/2005 | Benaloh | .................. | G06F 21/31 713/155 |
| 2006/0167784 A1* | 7/2006 | Hoffberg | .............. | G06Q 20/401 705/37 |
| 2009/0276786 A1* | 11/2009 | Bavaria | ................. | G06F 9/4411 718/104 |
| 2012/0131653 A1* | 5/2012 | Pasquero | ................. | G06F 21/34 726/6 |
| 2014/0310416 A1* | 10/2014 | Durbha | .................. | H04L 47/70 709/225 |
| 2015/0113125 A1* | 4/2015 | Chamberlin | ........ | H04L 63/0209 709/224 |
| 2015/0113277 A1* | 4/2015 | Harkins | .................. | H04L 9/083 713/171 |
| 2015/0237054 A1* | 8/2015 | Borovikov | .............. | H04L 63/10 726/4 |

OTHER PUBLICATIONS

Hoffmann et al., "Smartproxy: Secure Smartphone-Assisted Login on Compromised Machines", Detection of Intrusions and Malware, and Vulnerability Assessment Lecture Notes in Computer Science vol. 7591, 2013, pp. 184-203.

IBM, "Sign-on/authorization using WLAN enabled mobile phones", An IP.com Prior Art Database Technical Disclosure, Original Publication Date: Jun. 15, 2004, IP.com No. IPCOM000029070D, IP.com Electronic Publication: Jun. 15, 2004, pp. 1-3.

China Patent Application No. 201310556745.1, entitled "Method, Apparatus and System for Protecting Sensitive Information", filed on Nov. 11, 2013.

* cited by examiner

PROTECTING SENSITIVE INFORMATION USING A TRUSTED DEVICE

BACKGROUND OF THE INVENTION

The present invention generally relates to the information processing field, and more particularly, to protecting sensitive information.

With the continual development of web applications, individuals' lives are becoming increasingly dependent on web applications. One example of a widely used web application is the use of online payments in online shopping. People also possess various accounts in web applications including, for example, game accounts or online banking accounts. These web applications, while enriching people's lives, bring with them certain risks; therefore, protecting user accounts becomes a problem to be solved.

One widely used solution for protecting user accounts solution is the use of a username and password. However, if a user is using an untrusted device, it can be very dangerous to input the user's username and password on the untrusted device. For example, username and password input by a user on a public computer may be very likely to be captured by malicious code installed on that public computer. The leakage of that username and password will bring high security risk to the user's account.

One known solution for preventing leakage of a user's username and password on an untrusted device is to use a USB authentication device. Currently, many banks use USB keys for online payments, thereby preventing a malicious user from making an online payment operation even if the username and password have been disclosed. However, one USB key is required for each web application, which can inconvenience the user and provide for a lot of unnecessary hardware.

Thus, there is a need for a technical solution which protects sensitive information of a user (such as username and password) from being captured by malicious codes in an untrusted device while the user is using web applications through the untrusted device, and preferably this technical solution needs to be applicable to a variety of web applications without adopting a different technical solution for each web application.

SUMMARY

In view of the above problems in the art, embodiments of the present invention provide a method, apparatus and system for protecting sensitive information, such that sensitive information of a user can be protected while using web applications though an untrusted device.

According to an aspect of the invention, there is provided a method for protecting sensitive information, the method being executed on an untrusted device, the method comprising: determining that the sensitive information is required by a server; transmitting first information to a trusted device connected to the untrusted device, where the first information enables the sensitive information to be transmitted from the trusted device to the server, wherein the sensitive information is input on the trusted device; receiving second information transmitted by the trusted device, where the second information is generated based on the first information and the second information includes the sensitive information encrypted with a first secret key; and forwarding the second information to the server; wherein the first secret key meets one of the following: the untrusted device does not know the first secret key; and the untrusted device knows the first secret key but is unable to use the first secret key to decrypt the encrypted sensitive information.

According to another aspect of the invention, there is provided a method for protecting sensitive information, the method comprising: receiving fourth information transmitted by an untrusted device, where the fourth information enables the sensitive information to be transmitted from a trusted device to a server; receiving the sensitive information input by a user; generating fifth information based on the fourth information and the sensitive information; encrypting at least the sensitive information in the fifth information with a second secret key; and transmitting the fifth information containing the encrypted sensitive information to the untrusted device to make the untrusted device to forward it to the server indicated by the fourth information; wherein the second secret key meets one of the following: the untrusted device does not know the second secret key; and the untrusted device knows the second secret key but is unable to use the second secret key to decrypt the encrypted sensitive information.

According to another aspect of the invention, there is provided an untrusted device, comprising: a determining module configured to determine that sensitive information is required by a server; a first transmitting module configured to transmit first information to a trusted device connected to the untrusted device, where the first information enables the sensitive information to be transmitted from the trusted device to the server, wherein the sensitive information is input on the trusted device; a first receiving module configured to receive second information transmitted by the trusted device, where the second information is generated based on the first information and the second information includes the sensitive information encrypted with a first secret key; and a second transmitting module configured to forward the second information to the server; wherein the first secret key meets one of the following: the untrusted device does not know the first secret key; the untrusted device knows the first secret key but is unable to use the first secret key to decrypt the encrypted sensitive information.

According to another aspect of the invention, there is provided a trusted device, comprising: a third receiving module configured to receive fourth information transmitted by an untrusted device, where the fourth information enables the sensitive information to be transmitted from the trusted device to a server; a fourth receiving module configured to receive the sensitive information input by a user; an information generation module configured to generate fifth information based on the fourth information and the sensitive information; an encrypting module configured to encrypt at least the sensitive information in the fifth information with a second secret key; and a fourth transmitting module configured to transmit fifth information containing the encrypted sensitive information to the untrusted device to make the untrusted device to forward it to a server indicated by the fourth information; wherein the second secret key meets one of the following: the untrusted device does not know the second secret key; and the untrusted device knows the second secret key but is unable to use the second secret key to decrypt the encrypted sensitive information.

The technical solution provided in the invention can protect sensitive information of a user while the user is using web applications through an untrusted device.

DETAILED DESCRIPTION

Figure 1:
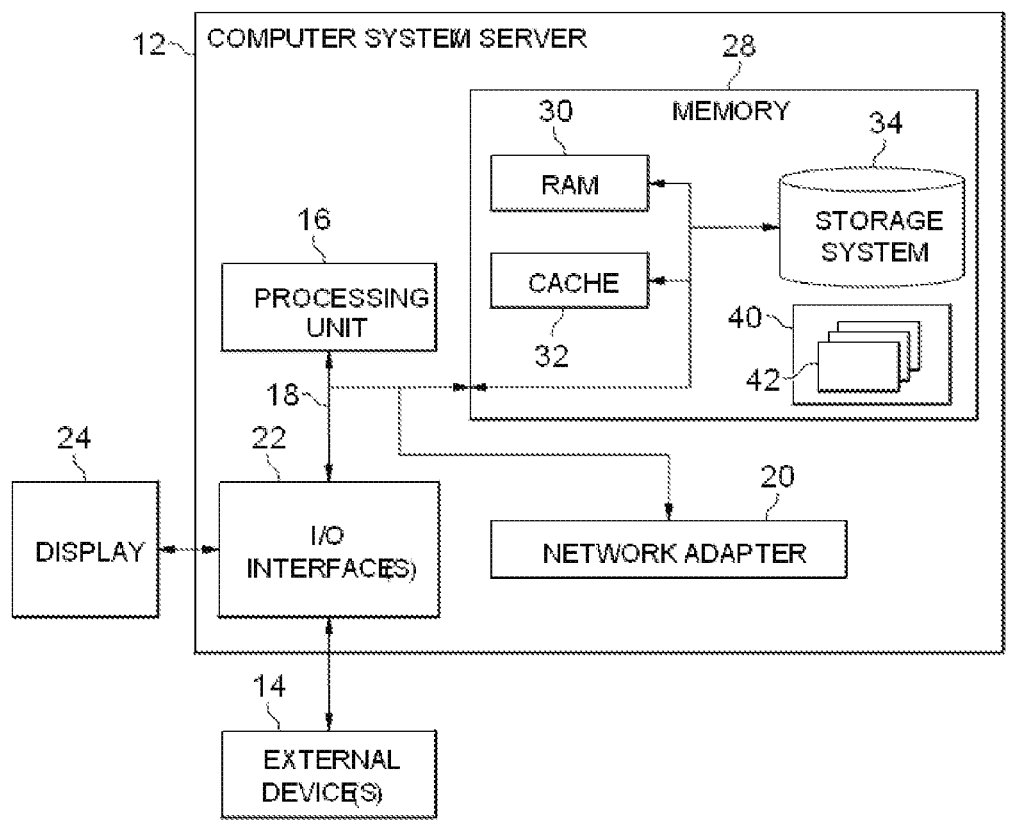
FIG. 1 depicts a block diagram of an exemplary computer system/server 12 which is applicable to implement the embodiments of the invention.

Some preferable embodiments will be described in more detail with reference to the accompanying drawings. However, it should be understood that the present disclosure can be implemented in various manners, and thus should not be limited to the embodiments set forth herein. Rather, these embodiments are provided so that this disclosure will be thorough and complete, and fully convey the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a block diagram of an exemplary computer system/server 12 which is applicable to implement the embodiments of the present invention. The computer system/server 12 shown in FIG. 1 is only an example and is not intended to limit the scope of use and functionality of embodiments of the invention in any way.

As shown in FIG. 1, the computer system/server 12 is embodied in the form of a general-purpose computing device. The components of the computer system/server 12 may include, but are not limited to, one or more processors or processing units 16, a system memory 28, and a bus 18 that couples with various system components including the system memory 28 and the processor 16.

The bus 18 represents one or more of several types of bus structures, comprising a memory bus or a memory controller, a peripheral bus, an accelerated graphics port, and a processor or a local bus using any of a variety of bus structures. By way of example, such architectures include, but not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 typically includes a variety of computer system readable media. Such media may be any available media that is accessible by the computer system/server 12, including volatile and non-volatile media, removable and non-removable media.

The system memory 28 may include computer system readable media in the form of a volatile memory, such as random access memory (RAM) 30 and/or cache memory 32. The computer system/server 12 may further include other removable/non-removable, volatile/non-volatile computer system storage media. By way of example only, storage system 34 can be used for reading and writing a non-removable and non-volatile magnetic media (not shown in FIG. 1, and typically called a "hard drive"). Although not shown in FIG. 1, a disk drive for reading and writing a removable and non-volatile magnetic disk (e.g., a "floppy disk"), and an optical drive for reading and writing a removable and non-volatile optical disk such as a CD-ROM, DVD-ROM or other optical media can be provided. In such instances, each drive can be coupled to the bus 18 by one or more data media interfaces. The memory 28 may include at least one program product having a set (e.g., at least one) of program modules that are configured to carry out the functions of embodiments of the invention.

Program/utility 40, having a set (at least one) of program modules 42, may be stored in memory 28. By way of example, such program modules 42 include, but are not limited to, an operating system, one or more application programs, other program modules, and program data; furthermore, each or a certain combination of these examples may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; with one or more devices that enable a user to interact with the computer system/server 12; and/or with any devices (e.g., network card, modem, etc.) that enable the computer system/server 12 to communicate with one or more other computing devices. Such communication can be performed via Input/Output (I/O) interfaces 22. Moreover, the computer system/server 12 can also communicate with one or more networks such as a local area network (LAN), a general wide area network (WAN), and/or a public network (e.g., the Internet) via network adapter 20. As depicted, the network adapter 20 communicates with other components of the computer system/server 12 via bus 18. It should be understood that although not shown, other hardware and/or software modules could be used in conjunction with the computer system/server 12, including, but not limited to, microcode, device drivers, redundant processing units, external disk drive arrays, RAID systems, tape drives, and data archival storage systems, etc.

Figure 2:
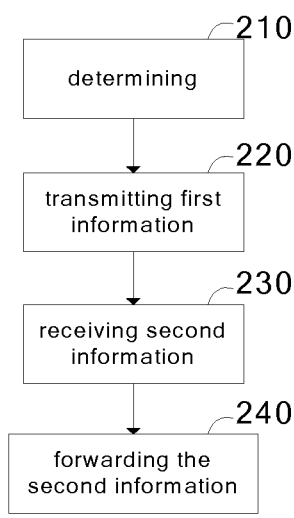
FIG. 2 depicts a flowchart diagram of a method for protecting sensitive information according to an embodiment of the invention.

FIG. 2 depicts a method for protecting sensitive information according to an embodiment of the invention. The method comprises: (i) step 210, determining that the sensitive information is required by a server; (ii) step 220, transmitting first information to a trusted device connected to the untrusted device, the first information enabling the sensitive information to be transmitted from the trusted device to the server, wherein the sensitive information is input on the trusted device; (iii) step 230, receiving second information transmitted by the trusted device, the second information being generated based on the first information, the second information including the sensitive information encrypted with a first secret key, wherein the first secret key meets one of the following: the untrusted device does not know the first secret key, and/or the untrusted device knows the first secret key but is unable to use the first secret key to decrypt the encrypted sensitive information; and (iv) step 240, forwarding the second information to the server. With the technical solution provided in this embodiment of the invention, when there is a need to provide sensitive information to the server, inputting the sensitive information on an untrusted device can be avoided by inputting the sensitive information on a trusted device. In this embodiment, the untrusted device functions as a relay or an agent, and the untrusted device is unable to acquire the sensitive information input from the trusted device. In this way, it is convenient for the user to use web applications on the untrusted device while ensuring the safety of the sensitive information of the user; thus, malicious codes installed on the untrusted device is unable to acquire the sensitive information input by the user from the trusted device. Further, with the technical solution provided in this embodiment, there is no need to make any change on the server side. The technical solution provided in this embodiment is applicable to a variety of web applications, and there is no need to use different technical solutions for different web applications. In this embodiment, the second information is generated based on the first information. In one example, the first information is webpage information, and the second information is a hypertext transfer protocol (HTTP) request generated based on the webpage information. In another example, the first information is an HTTP request generated based on webpage information, and the second information is an HTTP request filled with the sensitive information. Those skilled in the art should appreciate that generating the second information based on the first information may comprise more embodiments, description of which will be omitted herein.

In an embodiment of the invention, the sensitive information may comprise the username and password of a user, for example. Those skilled in the art should appreciate that the sensitive information may comprise more types of information as long as this information is desired to be protected by the user and the user is not willing for the information to be stolen by malicious codes on the untrusted device. For example, the sensitive information may further comprise a bank account, an answer to a security question, private information of a user (such as mobile phone number, mail address, identity card number of the user), and others.

In an embodiment of the invention, the untrusted device may be, for example, a public computer or a public terminal in other forms. Or, the untrusted device may be a terminal provided by another person or institution. As used herein, an untrusted device is any device that the user considers to be unsafe.

In an embodiment of the invention, the trusted device may be, for example, a mobile phone, a PDA, or another device possessed by a user personally. It may be regarded as a trusted device as long as the user considers that it is safe.

In an embodiment of the invention, a connection will be established between the trusted device and the untrusted device. The connection may be a Bluetooth connection, an infrared connection, a USB connection, a local area network or wide area network and other wired or wireless connection. Further, in another embodiment of the invention, the connection established between the trusted device and the untrusted device is a secure connection. The invention does not limit the specific form of the secure connection as long as the information delivered on this connection will not be acquired by any malicious codes on the untrusted device. This can be assured both by: (i) the connection protocol of the trusted device and the untrusted device; and (ii) the privilege control of the trusted device (for example, if the trusted device does not allow any access from the untrusted device or does not allow access by the specific type of application).

In an embodiment of the invention, the method may be implemented with a browser. In another embodiment of the invention, the method may be implemented with a plugin on a browser. Those skilled in the art should appreciate that the method may also be implemented with other separate software or hardware.

In an embodiment of the invention, step 210 comprises one of: (i) analyzing the information transmitted by the server to determine that the sensitive information is required by the server; and (ii) determining that the sensitive information is required by the server based on the input of a user, the input indicating that the sensitive information is required by the server. In another embodiment of the invention, the step of analyzing the information transmitted by the server to determine that the sensitive information is required by the server may comprise, for example, determining that the sensitive information is required by the server by analyzing the tags included in the webpage information transmitted by the server. In another embodiment of the invention, more particularly, determining that the sensitive information is required by the server by analyzing the information transmitted by the server may comprise, for example, analyzing tags included in the webpage information transmitted by the server to determine that sensitive information input by a user is required by the webpage. In another embodiment of the invention, determining that sensitive information is required by the server based on the input of a user may be embodied as, for example: (i) displaying a webpage on the untrusted device based on the webpage information received from server; (ii) receiving the input of a user, the input indicating that sensitive information is required by the server; and (iii) determining that sensitive information is required by the server. In one embodiment, the user and/or untrusted device may automatically understand that the server requires the sensitive information; in another embodiment, the user may identify that sensitive information needs to be input and therefore trigger the request itself. Those skilled in the art may further obtain more embodiments about how to determine that sensitive information is required by the server based on the above specific examples. For example, the information transmitted by the server may be webpage information and also be another type of message as long as this message can indicate that a user needs to input sensitive information.

The above two embodiments will be described in detail by way of specific examples. Example 1: server A transmits webpage information to untrusted device B, the webpage information including forms or form elements having special html/CSS tags. Browser plugin C on the untrusted device B determines that the webpage needs a user to input a username and password based on the forms or form elements having special html/CSS tags included in the webpage information. At this time, the untrusted device completes the determination that sensitive information is required by the server. Example 2: server A transmits webpage information to untrusted device B. The browser on the untrusted device B presents a user with the webpage corresponding to the webpage information. At this time, the user finds that the presented webpage requires username and password input. The user clicks the plugin button on the browser on the untrusted device B, which represents that the user wishes to input sensitive information on the trusted device. After receiving the user's click, the untrusted device determines that the sensitive information is required by the server.

In an embodiment of the invention, the first information transmitted from an untrusted device to a trusted device may comprise an HTTP request directing to a certain server, for example. The trusted device may fill sensitive information in the HTTP request and transmit the HTTP request including the sensitive information to the server based on the server directed by the HTTP request. In an embodiment, the HTTP request includes a URL, and the trusted device may fill sensitive information in the URL and transmit the URL filled with the sensitive information to the server. In another embodiment, the first information includes a URL; for example, the trusted device fills the sensitive information in the URL and encrypts it, then transmits it to the untrusted device which forwards it to the server. The first information may include the webpage information transmitted by the server; for example, the browser on the trusted device may generate the URL including the sensitive information based on the webpage information, and transmit the URL including the sensitive information to the server. The first information may include the filtered webpage information transmitted by the server; for example, a picture in the webpage information transmitted by the server may be filtered out to form the filtered webpage information transmitted by the server. The browser on the trusted device may generate the URL including sensitive information based on the filtered webpage information transmitted by the server and transmit it to the server. Those skilled in the art can appreciate that the first information may include other information which enables the sensitive information to be transmitted from the trusted device to the server. For example, it may include a REST request or other request of non-HTTP protocol. In the following embodiments, only certain examples will be described, and for brevity purposes, not all possible first information will be illustrated, as those skilled in the art can obtain embodiments on how to implement the examples of other first information based on the description.

In an embodiment of the invention, the method as shown in FIG. 2 may comprise: (i) presenting prompt information to a user to ask the user whether to go to the trusted device to input sensitive information in response to determining that the sensitive information is required by the server; and (ii) executing step 220 in response to the user choosing to go to the trusted device to input the sensitive information.

Those skilled in the art can appreciate that there are various manners for presenting prompt information to a user to ask the user whether to go to a trusted device to input sensitive information. For example, this can be done by directly asking the user to go to a certain trusted device to input sensitive information. Alternatively, this can be done by first asking the user whether the user wants to go to a trusted device to input sensitive information and then providing a list of trusted devices for the user selection in response to the user selecting yes, and then executing step 220 in response to the user selecting a certain trusted device. Or, in yet another example, the method may include asking the user to go to a trusted device to input sensitive information while presenting the user with a list of trusted devices, and executing step 220 in response to the user selecting a certain trusted device. Those skilled in the art can appreciate that the technical solution provided in the embodiment is used especially in step 210 where the information transmitted by the server is analyzed to determine that the sensitive information is required by the server. But, the technical solution provided in the embodiment may also be implemented in conjunction with step 210 of determining that sensitive information is required by a server based on the input of a user. In the above embodiment, for example, in step 210, when a user clicks a button to represent that he or she wishes to go to a trusted device to input sensitive information, the user is provided with a list of trusted devices and step 220 is executed in response to the user selecting a certain trusted device. By prompting the user and providing the list of trusted devices for selection, the user can control which device the input of the sensitive information is switched to, such that the whole technical solution is more safe and the user experience is better.

In an embodiment of the invention, the method as shown in FIG. 2 may further comprise generating a first message including a first field, wherein the first field is used for placing the sensitive information. In the embodiment, the first information includes the first message; the second information includes the first message filled with the sensitive information; and the second information is encrypted with the first secret key. Those skilled in the art can appreciate that the first field for placing the sensitive information may directly place the sensitive information, or place the encoded first information, and may also place the sensitive information and other information after they are encoded. The technical solution provided in this embodiment will be described below by the following specific examples. After an untrusted device B receives webpage information transmitted by the server, it generates a response message based on the webpage information, and the response message includes a field for placing the sensitive information. By way of example, the response message may include a URL. In this way, the untrusted device will transmit the generated URL to a trusted device. After the trusted device receives the URL, it fills the sensitive information input by a user in a corresponding field in URL. Specifically, the field for placing the sensitive information may be informed by the untrusted device to the trusted device, or may be regulated based on a certain rule, or may be known by the trusted device per se from a web site. For example, the untrusted device may inform the trusted device of the parameter names corresponding to the sensitive information, or the trusted device may acquire the parameter names corresponding to the sensitive information from a web site that the web application locates. Or, the trusted device may know that the untrusted device may use given characters to fill the field of placing the sensitive information, and the trusted device may search the given characters after the URL is received and use the sensitive information input by the user to replace the given characters, thereby obtaining the URL including the sensitive information. Those skilled in the art can appreciate that the embodiment does not limit whether the field for placing the sensitive information in the response message generated by the untrusted device is filled in a case that the field for placing the sensitive information is directly communicated by the untrusted device to the trusted device (that is, the field for placing the sensitive information may be filled or be blank). Those skilled in the art can appreciate that both the requirement of computing capability of the trusted device and the amount of information selected and sent to the trusted device may be reduced by generating the first message on the untrusted device and by filling the sensitive information in the first message on the trusted device. If the computing capability of the trusted device is poor, generating the first message by the untrusted device can reduce the computing amount and processing time of the trusted device.

In an embodiment of the invention, the first message may not be generated by the untrusted device, but the message including the sensitive information is directly generated by the trusted device and transmitted to the server. In this embodiment, step 220 comprises forwarding the information received from the server to the trusted device, wherein the information received from the server includes information enabling the trusted device to generate a second message, the second message includes a second field for placing the sensitive information. Those skilled in the art can appreciate that the second field for placing the sensitive information may directly include the sensitive information, or may include the encoded first information, and may also include the sensitive information and other information after they are encoded. In this embodiment, the second information includes the second message, and the second information is encrypted with the first secret key. In an embodiment of the invention, the forwarding may transmit the unmodified information transmitted by the server to the trusted device, and may also transmit the filtered information transmitted by the server to the trusted device. The technical solution provided in this embodiment is especially suitable when the untrusted device automatically determines that sensitive information is required by the server and transmits the first information to the trusted device. In this situation, the whole webpage may be displayed on the trusted device to communicate to the user which web application the sensitive information is being used for. In one specific example of the embodiment of the invention, the second message may be a URL. After untrusted device B has received the webpage information transmitted by server A, it transmits all of the webpage information to trusted device C. The trusted device C generates a URL based on the received webpage information, and makes the sensitive information input by a user to be included in the URL.

In an embodiment of the invention, the trusted device may use a symmetric encryption algorithm to encrypt sensitive information and may also use an asymmetric encryption algorithm to encrypt the sensitive information. In one specific example of this embodiment, the trusted device may directly encrypt the sensitive information and include it in the second information to be transmitted to an untrusted device, and may also encrypt the second information including the sensitive information. The symmetric encryption algorithm may use a DES algorithm, a 3DES algorithm, a TDEA algorithm, a Blowfish algorithm, an RC5 algorithm, and/or an IDEA algorithm, for example, while the asymmetric algorithm may use an RSA algorithm, an Elgamal algorithm, and/or an ECC algorithm, for example. In the following embodiments, SSL is just a protocol for using the symmetric encryption algorithm. Those skilled in the art can appreciate that SSL is only an example of using the symmetric encryption algorithm in each of the embodiments (for example, a TLS protocol or other protocols may also be used). In one specific example of this embodiment, the first secret key is a secret key of a symmetric encryption algorithm, specifically, the secret key of a symmetric encryption algorithm determined in the connection establishment between the trusted device and the server. When creating an SSL connection between server A and trusted device C, a session key will be negotiated during the SSL connection between the server A and the trusted device C as a secret key for the two devices. When creating an SSL connection between the server A and the trusted device C, an untrusted device may be used as an intermediate forwarding device, or, the trusted device may directly create an SSL connection with server A without using an untrusted device if the trusted device C has a connection mode enabling direct communication with the server A. For example, if the trusted device is a cell phone, an SSL connection with server A may be directly established using a wireless communication network. In this example, this session key may be used as the first secret key. Because the untrusted device does not know this session key, the untrusted device is unable to decrypt the information sequentially encrypted with the first secret key. In this example, the time at which an SSL connection is established between the server A and the trusted device C is not limited as long as the SSL connection establishment is completed before the trusted device needs to use the first secret key to encrypt. For example, the untrusted device B may request that trusted device C create an SSL connection with the server A after it (the untrusted device B) has determined that sensitive information is required by the server, or, the trusted device C may create an SSL connection with the server A after receiving the first information transmitted by the untrusted device B. The act of trusted device C creating a SSL connection with the server A may be triggered by untrusted device B, and may also be triggered by trusted device C itself. In one specific example of this embodiment, the first secret key is a public key of the server A. In this example, the public key of the server A may be forwarded by the untrusted device B to the trusted device C, or may be directly transmitted by server A to the trusted device C. Since the public key of the server A does not need to be kept secret, the solution of forwarding it by the untrusted device B to the trusted device C is more effective. In this example, the untrusted device B may create an SSL connection with the server A, and the server A may transmit the webpage information of a logon page to the untrusted device after the connection is established. The public key of the server A may be transmitted to the untrusted device B while creating the SSL connection and may also be transmitted to the untrusted device B while transmitting the logon page. The untrusted device B may transmit the public key of the server A to the trusted device C together with the webpage information when forwarding it to the trusted device C, or may transmit the public key of the server A to the trusted device C while transmitting the URL to the trusted device C. Those skilled in the art may appreciate that transmitting the public key of server A may be performed at other times, for example, at the time while establishing a connection between the trusted device C and the untrusted device B, which may not be limited in the embodiments of the invention. Trusted device C may use the public key of server A as the first secret key to encrypt the sensitive information. Due to the characteristics of asymmetric algorithms, even if the untrusted device B knows the public key of the server A, it still is unable to decrypt the encrypted information, only the server A can use its private key to decrypt the encrypted information. In this way, the sensitive information input by a user can be protected from being acquiring by malicious codes on the untrusted device.

In an embodiment of the invention, the embodiment as shown in FIG. 2 may further comprise: (i) establishing a connection with the server; and (ii) transmitting the public key of the server acquired in the connection establishment to the trusted device. In this embodiment, the untrusted device B will create a connection with the server A and acquire the public key of the server in the creation of the connection. Untrusted device B will transmit the acquired public key of the server to trusted device C.

Figure 3:
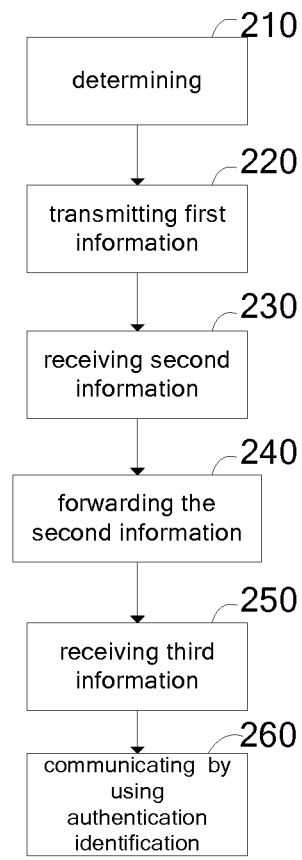
FIG. 3 depicts a flowchart diagram of a method for protecting sensitive information according to another embodiment of the invention.

In an embodiment of the invention, in reference to FIG. 3, the embodiment as shown in FIG. 2 may further comprise: (i) step 250, receiving third information transmitted by the trusted device, the third information including the authentication identification transmitted by the server based on the sensitive information; and (ii) step 260, communicating with the server by using the authentication identification (wherein step 250 is executed after step 240). If the technical solution provided in the steps 210-240 is applied to the authentication phase of web applications, the server will transmit the authentication identification based on the sensitive information input by a user after the untrusted device has forwarded the second information transmitted by the trusted device to the server. The trusted device needs to decrypt the authentication identification after it has received the authentication identification. The authentication identification transmitted from the server to the trusted device may be forwarded by the untrusted device, and may also be transmitted by the direct connection with the trusted device. In these embodiments, the authentication identification is generally encrypted. For encryption of the authentication identification, the method may use the same encryption algorithm as that used for the sensitive information, and may also use different encryption algorithms, which are not limited herein. The trusted device transmits the decrypted authentication identification to the untrusted device. Afterwards, the untrusted device may use the authentication identification to make subsequent communication with the server, that is, the user may continually use the web application which is authenticated at the authentication phase on the untrusted device.

Figure 4:
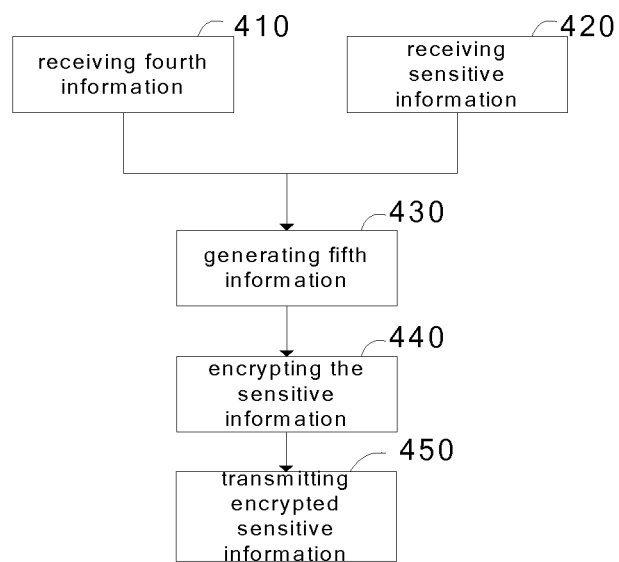
FIG. 4 depicts a flowchart diagram of a method for protecting sensitive information according to yet another embodiment of the invention.

As shown in FIG. 4, a method is provided for protecting sensitive information according to an embodiment of the invention, where the method is implemented on an untrusted device. The method comprises: (i) step 410, receiving fourth information transmitted by the untrusted device, where the fourth information enables the sensitive information to be transmitted from the trusted device to a server; (ii) step 420, receiving the sensitive information input by a user; (iii) step 430, generating fifth information based on the fourth information and the sensitive information; (iv) step 440, encrypting at least the sensitive information in the fifth information with the second secret key, wherein the second secret key meets one of the following: the untrusted device does not know the second secret key, and the untrusted device knows the second secret key but is unable to use the second secret key to decrypt the encrypted sensitive information; and (v) step 450, transmitting the fifth information containing the encrypted sensitive information to the untrusted device for forwarding to the server indicated by the fourth information.

The user may input the sensitive information on the trusted device by using the technical solution provided in this embodiment, which avoids a problem of leaking the sensitive information resulting from inputting the sensitive information on the untrusted device. Further, the method does not require any change on the server side; thus, the implementation cost is low. At the same time, the method can be applied to various web applications, and there is no need to design different technical solutions or use different hardware for each of the web applications. In this embodiment, there is no particular execution order between the step 410 and the step 420, and they can be executed at the same time or in any order wherein it is not required to specify which step is to be executed first. In this embodiment, the second secret key may be directly used to encrypt the fifth information, and also may be used to encrypt the sensitive information in the fifth information.

In an embodiment of the invention, the method as shown in FIG. 4 further comprises: (i) receiving the authentication identification originated from the server forwarded by the untrusted device; (ii) decrypting the authentication identification; and (iii) transmitting the decrypted authentication identification to the untrusted device to enable the untrusted device to use the authentication identification to communicate with the server.

In an embodiment of the invention, the method as shown in FIG. 4 further comprises establishing a connection with the server. In this embodiment, the second secret key includes the secret key of a symmetric encryption algorithm determined in the connection establishment between the trusted device and the server. In this embodiment, the established connection with server may be established by the untrusted device (that is, the untrusted device may be used as a forwarding device) and/or any other way to directly create the connection with the server.

In an embodiment of the invention, the method as shown in FIG. 4 further comprises receiving the public key of the server transmitted by the untrusted device, where the second secret key includes the public key of the server. In another embodiment of the invention, the trusted device may directly acquire a public key from the server, and use the public key of the server as the second secret key.

The embodiment as shown in FIG. 4 may also refer to the above embodiments. For example, the second secret key may be the first secret key, and the fourth information may be the first information. Other details for reference are omitted herein.

Embodiments as shown in FIG. 4 may be combined with the above embodiments to obtain more embodiments. Then, with reference to FIG. 5, the examples in conjunction with the embodiments as shown in FIGS. 3 and 4 will be described in detail below.

In step 510 (see FIG. 5), a user triggers a web application on an untrusted device (such as, a public computer).

In step 520, the server creates an SSL connection with the untrusted device, and transmits the logon page to the untrusted device after the connection is established.

In step 530, the untrusted device presents the user with the logon page.

In step 540, the trusted device is connected to the untrusted device by a Bluetooth connection.

In step 550, the user wishes to input username and password required by the logon page from the trusted device (such as a cell phone of the user), and clicks a button for changing an input device on the untrusted device. Further, the user opens the corresponding software on the cell phone. Those skilled in the art can appreciate that the untrusted device may also transmit instruction(s) to the trusted device for requiring it to open the corresponding software. Or, the software on the trusted device may be in the open state all the time. After the button for changing the input device is clicked, the untrusted device will provide the user with a list of trusted devices connected to the untrusted device. The user selects a trusted device from the list.

In step 560, the untrusted device generates a URL based on the logon page transmitted by the server after receiving the selection of the user, and transmits the URL to the selected trusted device. At the same time, the untrusted device transmits the public key of the server to the trusted device along with the URL.

In step 570, the trusted device receives the username and password input by the user, and fills the username and password in the received URL.

In step 580, the trusted device encrypts the URL filled with the username and password with the public key of the server, and transmits the encrypted URL to the untrusted device.

In step 590, the untrusted device forwards the received encrypted URL to the server.

In step 5100, the server decrypts the received encrypted URL with its own private secret key to obtain the username and password after the encrypted URL is received, and authenticates with the username and password.

In step 5110, after passing the authentication, the server encrypts the authentication identification (such as cookie) with the public key of the trusted device, and transmits it to the untrusted device.

In step 5120, the untrusted device forwards the received encrypted authentication identification to the trusted device.

In step 5130, the trusted device decrypts the received authentication identification with its own private key, and transmits the decrypted authentication identification to the trusted device. Those skilled in the art can appreciate that the public key of the trusted device may be transmitted along with the encrypted URL, or a connection may be established between the trusted device and the server to notify the server of the public key.

In step 5140, the untrusted device communicates with the server using the received authentication identification. In this way, the user may continually use the web application on the untrusted device.

Figure 5:
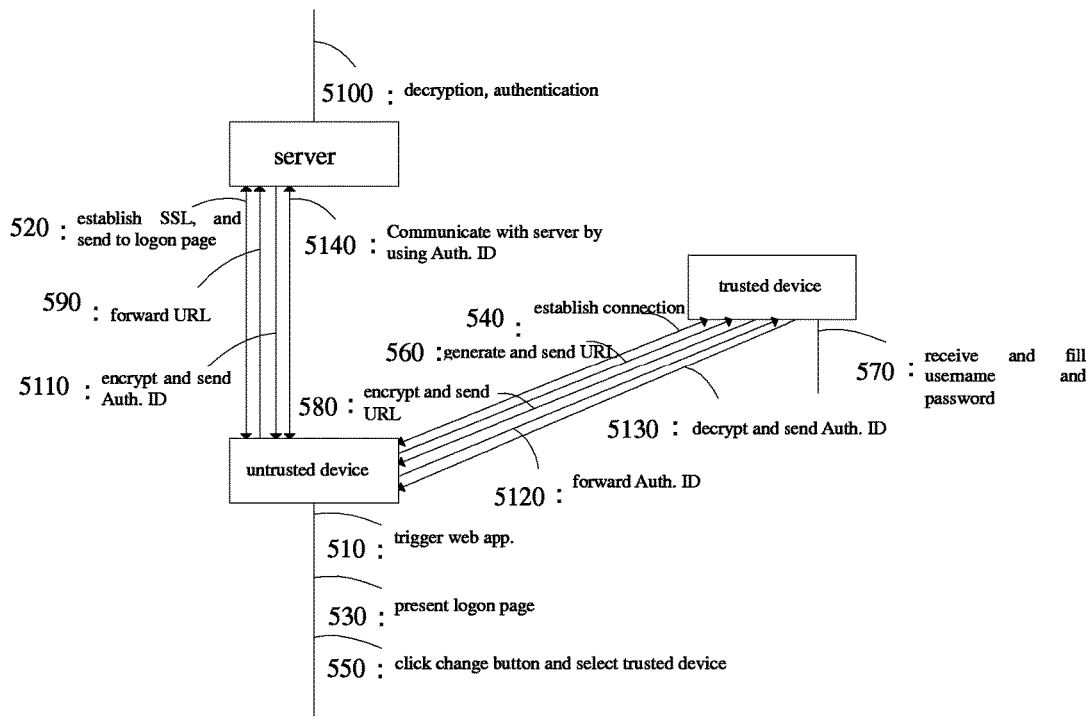
FIG. 5 depicts a flowchart diagram of an example of the combination of multiple embodiments of the invention.

According to above embodiments and the embodiment as shown in FIG. 5, those skilled in the art can obtain more combination examples. Next, with reference to FIG. 6, another example of the combination of the above embodiments of the invention will be described in detail.

In step 610, an untrusted device initiates a logon request. For example, a user performs an action on the untrusted device for representing that he or she wishes to use a certain web application. At this time, a browser on the untrusted device may generate a logon request for this web application.

In step 620, the untrusted device forwards the logon request to a trusted device connected to it. In this example, a USB connection has been established between the untrusted device and the trusted device. The forwarding may be triggered, for example, in such a manner that the user clicks a button on the untrusted device to represent that he or she wishes to go to a trusted device for inputting the sensitive information of all web applications, and then the user selects the trusted device. Or, the user clicks a button on the untrusted device to represent that he or she wishes to go to a trusted device for inputting the sensitive information of a certain web application, and then the user selects the trusted device. Those skilled in the art can appreciate that the user may also set a default trusted device, representing that the user wishes to use the default trusted device for inputting sensitive information, thereby allowing the user to bypass the process of selecting a trusted device after he or she clicks the button.

In step 630, the trusted device establishes a connection with the server directed by the logon request after receiving the logon request. In this process, the trusted device may use the untrusted device as a forwarding device to create a connection with the server. As such, the trusted device does not need to have the capability of communicating with the server directly, or, even if it has the capability, it does not need to use it. Alternatively, the trusted device may also create a connection with server directly, such as, via a wireless communication network. During the process of creating the connection, a secret key will be negotiated between the trusted device and the server, where the secret key will be used for encryption in subsequent sessions (hereafter the secret key will be referred to as the "first session secret key").

In step 640, the server transmits a logon page to the trusted device. The logon page is encrypted with the first session secret key, and is forwarded by the untrusted device.

In step 650, the trusted device uses the first session secret key to decrypt the logon page, thereby obtaining the logon page, and transmits the decrypted logon page to the untrusted device.

In step 660, the untrusted device displays this logon page and generates a URL based on the logon page, and transmits the URL to the trusted device. Those skilled in the art can appreciate that steps 650 and 660 are optional, and the step of generating a URL based on the logon page can be performed by the trusted device.

In step 670, the trusted device fills the sensitive information input by the user into the received URL, and encrypts the URL with the first session secret key.

In step 680, the trusted device transmits the encrypted URL to the server through the untrusted device.

In step 690, the server encrypts the logged-on page and cookies with the first session secret key, and transmits them to the trusted device through the untrusted device.

In step 6100, the trusted device decrypts the received logged-on page and cookies, and transmits them to the untrusted device. Those skilled in the art can appreciate that the logged-on page may also not be transmitted to the untrusted device as long as the authentication identification is transmitted to the untrusted device.

In step 6110, the untrusted device performs subsequent communication with the server by using the cookies, such that the user may use the logged-on web application on the untrusted device. In the subsequent communication, the untrusted device may negotiate a session secret key with the server. In this situation, the untrusted device does not need nor will know the first session secret key.

Figure 6:
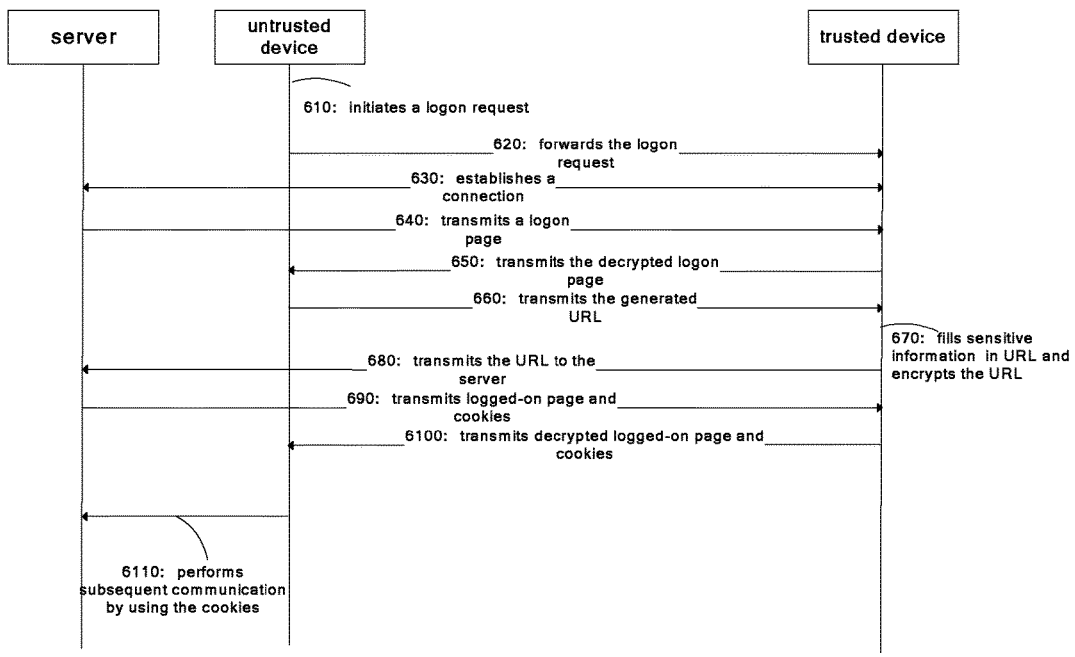
FIG. 6 depicts a flowchart diagram of another example of the combination of multiple embodiments of the invention.

Those skilled in the art may obtain more examples of the combination of the above embodiments without any inventive labor with reference to the two examples as shown in FIGS. 5 and 6.

Embodiments of the method of the present invention have been described above with reference to the appended drawings. Those skilled in the art can appreciate that the above method may be implemented in software and also in hardware, or in a combination of software and hardware. Further, those skilled in the art can appreciate that, by implementing each step of the above method in software and also in hardware, or in a combination of software and hardware, there may be provided a trusted device and also an untrusted device, and further a system for protecting sensitive information. Even if these devices and system are the same as the general processing device in the hardware structure, these devices and system present different features from that of the general processing device due to the function of software included therein, thereby forming the devices and system of the following embodiments of the invention. An untrusted device, trusted device and system for protecting sensitive information according to an embodiment of the invention will be described with reference to FIGS. 7, 8 and 9.

Figure 7:
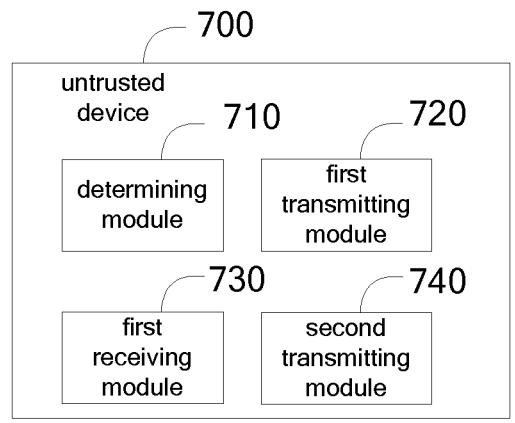
FIG. 7 depicts a structure diagram of an untrusted device according to an embodiment of the invention.

As shown in FIG. 7, there is provided an untrusted device 700 according to an embodiment of the invention. The untrusted device 700 comprises: (i) a determining module 710 configured to determine that sensitive information is required by a server; (ii) a first transmitting module 720 configured to transmit first information to a trusted device connected to the untrusted device, where the first information enables the sensitive information to be transmitted from the trusted device to the server, wherein the sensitive information is input on the trusted device; (iii) a first receiving module 730 configured to receive second information transmitted by the trusted device, where the second information is generated based on the first information, where the second information includes the sensitive information encrypted with a first secret key, wherein the first secret key meets one of the following: the untrusted device does not know the first secret key, and the untrusted device knows the first secret key but is unable to use the first secret key to decrypt the encrypted sensitive information; and (iv) a second transmitting module 740 configured to forward the second information to the server. With the untrusted device provided in this embodiment, malicious code on the untrusted device will not be able to acquire the sensitive information of the user. The sensitive information of the user is protected, and the user is able to use the untrusted device to use the web application. Those skilled in the art can appreciate that the first transmitting module 720 and the second transmitting module 740 may be embodied as one hardware structure and may also be embodied as two hardware structures. Further, the first receiving module 730 and the first transmitting module 720 may be embodied as one hardware structure and may also be embodied as two hardware structures. Or, the first receiving module 730, the first transmitting module 720 and the second transmitting module 740 may be embodied as one hardware structure.

In an embodiment of the invention, the determining module 710 (as shown in FIG. 7) comprises, for example, one of: (i) an analyzing unit configured to analyze the information transmitted by the server to determine that sensitive information is required by the server; and (ii) a user inputting unit configured to determine that sensitive information is required by the server based on the input of the user, where the input indicates that sensitive information is required by the server.

In an embodiment of the invention, the untrusted device 700 (as shown in FIG. 7) further comprises a generating module configured to generate a first message including a first field, wherein the first field is used for placing the sensitive information. In this embodiment, the first information includes the first message. The second information includes the first message filled with the sensitive information and the second information is encrypted with the first secret key.

In an embodiment of the invention, the first transmitting module 720 of the untrusted device 700 is, for example, configured to forward the information received from the server to the trusted device, wherein the information received from the server includes the information enabling the trusted device to generate a second message, where the second message includes a second field for placing the sensitive information. In this embodiment, the second information includes the second message and the second information is encrypted with the first secret key.

In an embodiment of the invention, the first secret key includes one of the following: (i) the secret key of a symmetric encryption algorithm determined in the connection establishment between the trusted device and the server; and/or (ii) a public key of the server.

In an embodiment of the invention, the untrusted device 700 (as shown in FIG. 7) further comprises: (i) a connection module configured to create a connection with the server; and (ii) a third transmitting module configured to transmit the public key of the server acquired in the connection establishment to the trusted device.

In an embodiment of the invention, the untrusted device 700 further comprises: (i) a second receiving module configured to receive third information transmitted by the trusted device, where the third information includes the authentication identification transmitted by the server based on the sensitive information; and (ii) a subsequent communication module configured to use the authentication identification to communicate with the server.

In an embodiment of the invention, the untrusted device 700 further comprises a presenting module configured to present the prompt information to a user to ask the user whether to go to a trusted device to input sensitive information. In this embodiment, the first transmitting module 720 is configured to transmit the first information to the trusted device connected to the untrusted device in response to the user choosing to go to the trusted device to input sensitive information.

Figure 8:
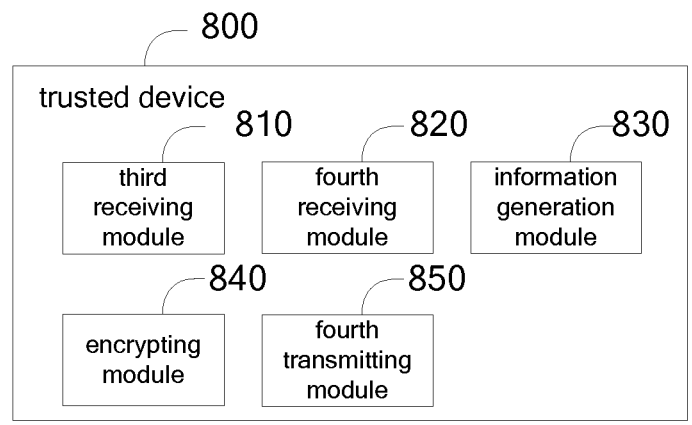
FIG. 8 depicts a structure diagram of a trusted device according to an embodiment of the invention.

As shown in FIG. 8, there is provided a trusted device 800 according to an embodiment of the invention. The trusted device 800 comprises: (i) a third receiving module 810 configured to receive fourth information transmitted by an untrusted device, where the fourth information enables the sensitive information to be transmitted from the trusted device to the server; (ii) a fourth receiving module 820 configured to receive the sensitive information input by a user; (iii) an information generation module 830 configured to generate fifth information based on the fourth information and the sensitive information; (iv) an encrypting module 840 configured to encrypt the sensitive information in the fifth information with a second secret key, wherein the second secret key meets one of the following: the untrusted device does not know the second secret key, and the untrusted device knows the second secret key but is unable to use the second secret key to decrypt the encrypted sensitive information; and (v) a fourth transmitting module 850 configured to transmit the fifth information containing the encrypted sensitive information to the untrusted device to make the untrusted device to forward it to the server indicated by the fourth information. The trusted device 800 according to the embodiment of the invention effectively protects the sensitive information of the user and avoids the inputting of sensitive information by the user on the untrusted device. Meanwhile, trusted device 800 enables the user to continually use the authenticated web application through the untrusted device.

In an embodiment of the invention, the trusted device 800 further comprises: (i) a fifth receiving module configured to receive the authentication identification originated from the server forwarded by the untrusted device; (ii) a decrypting module configured to decrypt the authentication identification; and (iii) a fifth transmitting module configured to transmit the decrypted authentication identification to the untrusted device to enable the untrusted device to use the authentication identification to communicate with the server.

In an embodiment of the invention, the trusted device 800 further comprises a connection creation module configured to create a connection with the server. In this embodiment, the second secret key includes the secret key of a symmetric encryption algorithm determined in the connection establishment between the trusted device and the server.

In an embodiment of the invention, the trusted device 800 further comprises a sixth receiving module configured to receive the public key of the server transmitted by the untrusted device. In this embodiment, the second secret key includes the public key of the server.

Figure 9:
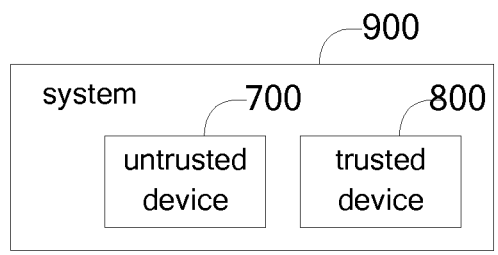
FIG. 9 depicts a structure diagram of a system for protecting sensitive information according to an embodiment of the invention.

As shown in FIG. 9, there is provided a system 900 for protecting sensitive information according to an embodiment of the invention. The system 900 comprises: (i) the untrusted device 700 as shown in FIG. 7; and (ii) the trusted device 800 as shown in FIG. 8. Further, the system 900 may further comprise a server.

Those skilled in the art can appreciate that the embodiments of the above apparatus may be combined with each other to obtain more embodiments which are omitted here for brevity. Further, for details of implementing the above embodiments and combination thereof, reference may be made to the corresponding method embodiments.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The various embodiments of the invention has been described in detail above, the description is illustrative and not exhaustive, and is not limited to the disclosed embodiments. Many modifications and variants will be apparent for those skilled in art. The terminologies used herein are selected to explain the principle, practical application of various embodiments or technology improvement in the market, or enable those skilled in art to understand the various embodiments disclosed herein.

The invention claimed is:

1. A method for protecting sensitive information, the method comprising:
   receiving first information transmitted by an untrusted device, where the first information enables the sensitive information to be transmitted from a trusted device to a server;
   receiving the sensitive information input by a user;

generating second information based on the first information and the sensitive information;
encrypting at least the sensitive information in the second information with a first secret key;
transmitting the second information containing the encrypted sensitive information to the untrusted device for forwarding to the server indicated by the first information;
receiving an authentication identification originated from the server and forwarded by the untrusted device;
decrypting the authentication identification; and
transmitting the decrypted authentication identification to the untrusted device to enable the untrusted device to use the authentication identification to communicate with the server;
wherein the first secret key meets one of the following: the untrusted device does not know the first secret key; and the untrusted device knows the first secret key but is unable use the first secret key to decrypt the encrypted sensitive information.

2. The method according to claim 1, further comprising:
establishing a connection with the server;
wherein the first secret key includes a secret key of a symmetric encryption algorithm determined during the process of establishing a connection with the server.

3. The method according to claim 1, further comprising:
receiving a public key of the server transmitted by the untrusted device;
wherein the first secret key includes the public key of the server.

4. A trusted device for protecting sensitive information, the trusted device comprising one or more hardware processors configured to execute the following program instructions:
first program instructions programmed to receive first information transmitted by an untrusted device, where the first information enables the sensitive information to be transmitted from a trusted device to a server;
second program instructions programmed to receive the sensitive information input by a user;
third program instructions programmed to generate second information based on the first information and the sensitive information;
fourth program instructions programmed to encrypt at least the sensitive information in the second information with a first secret key;
fifth program instructions programmed to transmit the second information containing the encrypted sensitive information to the untrusted device for forwarding to the server indicated by the first information;
sixth program instructions programmed to receive an authentication identification originated from the server and forwarded by the untrusted device;
seventh program instructions programmed to decrypt the authentication identification; and
eighth program instructions programmed to transmit the decrypted authentication identification to the untrusted device to enable the untrusted device to use the authentication identification to communicate with the server;
wherein the first secret key meets one of the following: the untrusted device does not know the first secret key; and the untrusted device knows the first secret key but is unable use the first secret key to decrypt the encrypted sensitive information.

5. The trusted device according to claim 4, further comprising:
sixth program instructions programmed to establish a connection with the server;
wherein the first secret key includes a secret key of a symmetric encryption algorithm determined during the process of establishing a connection with the server.

6. The trusted device according to claim 4, further comprising:
sixth program instructions programmed to receive a public key of the server transmitted by the untrusted device;
wherein the first secret key includes the public key of the server.

7. A computer system for protecting sensitive information, the computer system comprising:
an untrusted device; and
a trusted device;
wherein the trusted device comprises modules configured to execute the following program instructions:
first program instructions programmed to receive first information transmitted by the untrusted device, where the first information enables the sensitive information to be transmitted from the trusted device to a server;
second program instructions programmed to receive the sensitive information input by a user;
third program instructions programmed to generate second information based on the first information and the sensitive information;
fourth program instructions programmed to encrypt at least the sensitive information in the second information with a first secret key;
fifth program instructions programmed to transmit the second information containing the encrypted sensitive information to the untrusted device for forwarding to the server indicated by the first information;
sixth program instructions programmed to receive an authentication identification originated from the server and forwarded by the untrusted device;
seventh program instructions programmed to decrypt the authentication identification; and
eighth program instructions programmed to transmit the decrypted authentication identification to the untrusted device to enable the untrusted device to use the authentication identification to communicate with the server; and
wherein the first secret key meets one of the following: the untrusted device does not know the first secret key; and the untrusted device knows the first secret key but is unable use the first secret key to decrypt the encrypted sensitive information.

8. The computer system according to claim 7, further comprising:
sixth program instructions programmed to establish a connection with the server;
wherein the first secret key includes a secret key of a symmetric encryption algorithm determined during the process of establishing a connection with the server.

9. The computer system according to claim 7, further comprising:
sixth program instructions programmed to receive a public key of the server transmitted by the untrusted device;
wherein the first secret key includes the public key of the server.

* * * * *